US009960640B2

(12) United States Patent
Mach et al.

(10) Patent No.: US 9,960,640 B2
(45) Date of Patent: May 1, 2018

(54) SYSTEM AND METHOD FOR REGULATING INDUCTIVE POWER TRANSMISSION

(71) Applicant: POWERMAT TECHNOLOGIES LTD., Neve Ilan (IL)

(72) Inventors: Elieser Mach, Rosh Tzurim (IL); Arik Rofe, Jerusalem (IL); Oola Greenwald, Mevasseret Zion (IL); Guy Raveh, Mataa (IL)

(73) Assignee: POWERMAT TECHNOLOGIES LTD., Neve Ilan (IL)

( * ) Notice: Subject to any disclaimer, the term of this patent is extended or adjusted under 35 U.S.C. 154(b) by 1004 days.

(21) Appl. No.: 14/293,607

(22) Filed: Jun. 2, 2014

(65) Prior Publication Data

US 2014/0292097 A1     Oct. 2, 2014

Related U.S. Application Data

(63) Continuation-in-part of application No. 14/283,182, filed on May 20, 2014, now Pat. No. 9,035,501, (Continued)

(51) Int. Cl.
*H02J 50/12*     (2016.01)
*H02J 50/70*     (2016.01)
(Continued)

(52) U.S. Cl.
CPC ............. *H02J 50/12* (2016.02); *H01F 38/14* (2013.01); *H02J 5/005* (2013.01); *H02J 7/025* (2013.01); *H02J 50/70* (2016.02)

(58) Field of Classification Search
None
See application file for complete search history.

(56) References Cited

U.S. PATENT DOCUMENTS 3,414,796 A    12/1968  Henquet
3,771,085 A    11/1973  Hojo et al.
(Continued)

FOREIGN PATENT DOCUMENTS

EP    0160990 A2    11/1985
EP    0160990 B1    1/1991
(Continued)

OTHER PUBLICATIONS

Liu et al. "An Analysis of Double-layer Electromagnetic Shield for a Universal Contactless Battery Charging Platform", IEEE 2005, p. 1767-1772.
(Continued)

*Primary Examiner* — Rexford Barnie
*Assistant Examiner* — Swarna N Chowdhuri
(74) *Attorney, Agent, or Firm* — William Dippert; Laurence Greenberg; Werner Stemer

(57) ABSTRACT

An inductive power transfer system is provided that includes at least one inductive power receiver having at least one secondary inductor for forming an inductive couple with a primary inductor and providing power to an electric load and at least one inductive power outlet having at least one primary inductor wired to a power supply via a driver configured to provide a driving voltage across the primary inductor. The driving voltage is oscillating at a transmission frequency significantly different from the natural frequency of the inductive couple. The system further includes at least one power monitor and at least one frequency modulator operable to adjust the natural frequency of the inductive couple thereby regulating power provided to the electric load.

12 Claims, 11 Drawing Sheets

Related U.S. Application Data which is a continuation of application No. PCT/IL2012/050491, filed on Nov. 29, 2012, and a continuation of application No. 12/883,457, filed on Sep. 16, 2010, now Pat. No. 9,136,734, which is a continuation of application No. PCT/IL2008/001641, filed on Dec. 18, 2008.

(60) Provisional application No. 61/566,103, filed on Dec. 2, 2011, provisional application No. 61/129,970, filed on Aug. 4, 2008, provisional application No. 61/129,859, filed on Jul. 24, 2008, provisional application No. 61/129,526, filed on Jul. 2, 2008, provisional application No. 61/071,151, filed on Apr. 15, 2008, provisional application No. 61/064,618, filed on Mar. 17, 2008.

(51) Int. Cl.
  *H02J 5/00* (2016.01)
  *H01F 38/14* (2006.01)
  *H02J 7/02* (2016.01)

(56) References Cited

U.S. PATENT DOCUMENTS

| | | |
|---|---|---|
| 3,938,018 A | 2/1976 | Dahl |
| 4,160,193 A | 7/1979 | Richmond |
| 4,349,814 A | 9/1982 | Akehurst |
| RE31,524 E | 2/1984 | Hoebel |
| 4,431,948 A | 2/1984 | Elder et al. |
| 4,580,062 A | 4/1986 | MacLaughlin |
| 4,754,180 A | 6/1988 | Kiedrowski |
| 4,970,656 A * | 11/1990 | Lo .................. B06B 1/0253 310/316.01 |
| 4,977,515 A | 12/1990 | Rudden et al. |
| 5,221,877 A | 6/1993 | Falk |
| 5,278,771 A | 1/1994 | Nyenya |
| 5,367,242 A | 11/1994 | Hulman |
| 5,455,466 A | 10/1995 | Parks et al. |
| 5,455,467 A | 10/1995 | Young |
| 5,486,394 A | 1/1996 | Stough |
| 5,528,113 A | 6/1996 | Boys et al. |
| 5,550,452 A | 8/1996 | Shirai et al. |
| 5,600,225 A | 2/1997 | Goto |
| 5,680,035 A | 10/1997 | Haim et al. |
| 5,713,939 A | 2/1998 | Nedungadi et al. |
| 5,734,254 A | 3/1998 | Stephens |
| 5,762,250 A | 6/1998 | Carlton et al. |
| 5,821,728 A | 10/1998 | Schwind |
| 5,821,731 A | 10/1998 | Kuki et al. |
| 5,907,285 A | 5/1999 | Toms et al. |
| 5,929,598 A | 7/1999 | Nakama et al. |
| 5,949,214 A | 7/1999 | Broussard et al. |
| 6,042,005 A | 3/2000 | Basile et al. |
| 6,127,799 A | 10/2000 | Krishnan |
| 6,211,649 B1 | 4/2001 | Matsuda |
| 6,230,029 B1 | 5/2001 | Hahn et al. |
| 6,396,935 B1 | 5/2002 | Makkonen |
| 6,436,299 B1 | 8/2002 | Baarman et al. |
| 6,441,589 B1 | 8/2002 | Frerking et al. |
| 6,484,260 B1 | 11/2002 | Scott et al. |
| 6,532,298 B1 | 3/2003 | Cambier et al. |
| 6,556,415 B1 | 4/2003 | Lee et al. |
| 6,586,909 B1 | 7/2003 | Trepka |
| 6,624,616 B1 | 7/2003 | Frerking et al. |
| 6,644,557 B1 | 11/2003 | Jacobs |
| 6,673,250 B2 | 1/2004 | Kuennen et al. |
| 6,721,540 B1 | 4/2004 | Kayakawa |
| 6,731,071 B2 | 5/2004 | Baarman |
| 6,766,040 B1 | 7/2004 | Catalano et al. |
| 6,803,744 B1 | 10/2004 | Sabo |
| 6,825,620 B2 | 11/2004 | Kuennen et al. |
| 6,888,438 B2 | 5/2005 | Hui et al. |
| 6,894,457 B2 | 5/2005 | Germagian et al. |
| D519,275 S | 4/2006 | Shertzer |
| 7,043,060 B2 | 5/2006 | Quintana |
| 7,126,450 B2 | 10/2006 | Baarman et al. |
| 7,132,918 B2 | 11/2006 | Baarman et al. |
| 7,164,255 B2 | 1/2007 | Hui |
| 7,180,248 B2 | 2/2007 | Kuennen et al. |
| 7,180,265 B2 | 2/2007 | Naskali et al. |
| 7,224,086 B2 | 5/2007 | Germagian et al. |
| 7,233,319 B2 | 6/2007 | Johnson et al. |
| D553,852 S | 10/2007 | Brandenburg |
| 7,278,310 B1 | 10/2007 | Rice |
| 7,385,357 B2 | 6/2008 | Kuennen et al. |
| 7,392,068 B2 | 6/2008 | Dayan et al. |
| 7,405,535 B2 | 7/2008 | Frerking et al. |
| 7,462,951 B1 | 12/2008 | Baarman |
| D586,809 S | 2/2009 | Jones et al. |
| 7,518,267 B2 | 4/2009 | Baarman |
| 7,522,878 B2 | 4/2009 | Baarman |
| 7,576,514 B2 | 8/2009 | Hui |
| D599,735 S | 9/2009 | Amidei et al. |
| D599,736 S | 9/2009 | Ferber et al. |
| D599,737 S | 9/2009 | Amidei et al. |
| D599,738 S | 9/2009 | Amidei et al. |
| D603,603 S | 11/2009 | Laine et al. |
| 7,612,528 B2 | 11/2009 | Baarman et al. |
| D607,879 S | 1/2010 | Ferber et al. |
| D611,407 S | 3/2010 | Webb |
| D611,408 S | 3/2010 | Ferber et al. |
| 8,049,370 B2 | 11/2011 | Azancot |
| 2002/0057584 A1 | 5/2002 | Brockmann |
| 2002/0158512 A1 | 10/2002 | Mizutani et al. |
| 2003/0210106 A1 | 11/2003 | Cheng et al. |
| 2004/0023633 A1 | 1/2004 | Gordon |
| 2004/0195767 A1 | 10/2004 | Randall |
| 2004/0203537 A1 | 10/2004 | Yoshida et al. |
| 2004/0242264 A1 | 12/2004 | Cho |
| 2004/0261802 A1 | 12/2004 | Griffin et al. |
| 2005/0007067 A1 | 1/2005 | Baarman et al. |
| 2005/0083020 A1 | 4/2005 | Baarman |
| 2005/0130593 A1 | 6/2005 | Michalak |
| 2005/0164636 A1 | 7/2005 | Palermo et al. |
| 2005/0169506 A1 | 8/2005 | Fenrich et al. |
| 2005/0189910 A1 | 9/2005 | Hui |
| 2005/0192062 A1 | 9/2005 | Michkle et al. |
| 2005/0233768 A1 | 10/2005 | Guo et al. |
| 2006/0028176 A1 | 2/2006 | Tang et al. |
| 2006/0043927 A1 | 3/2006 | Beart et al. |
| 2006/0052144 A1 | 3/2006 | Seil et al. |
| 2006/0061325 A1 | 3/2006 | Tang et al. |
| 2006/0071632 A1 | 4/2006 | Ghabra et al. |
| 2006/0091222 A1 | 5/2006 | Leung et al. |
| 2006/0093132 A1 | 5/2006 | Desormiere et al. |
| 2006/0202665 A1 | 9/2006 | Hsu |
| 2007/0023559 A1 | 2/2007 | Scapillato et al. |
| 2007/0057763 A1 | 3/2007 | Blattner et al. |
| 2007/0076459 A1 | 4/2007 | Limpkin |
| 2007/0103110 A1 | 5/2007 | Sagoo |
| 2007/0136593 A1 | 6/2007 | Plavcan et al. |
| 2007/0165371 A1 | 7/2007 | Brandenburg |
| 2007/0182367 A1 | 8/2007 | Partovi |
| 2007/0210889 A1 | 9/2007 | Baarman et al. |
| 2007/0279002 A1 | 12/2007 | Partovi |
| 2008/0001922 A1 | 1/2008 | Johnson et al. |
| 2008/0030985 A1 | 2/2008 | Joen et al. |
| 2008/0049988 A1 | 2/2008 | Basile et al. |
| 2008/0055047 A1 | 3/2008 | Osada et al. |
| 2008/0079388 A1 | 4/2008 | Sarnowsky et al. |
| 2008/0132293 A1 | 6/2008 | Gundlach et al. |
| 2008/0157715 A1 | 7/2008 | Rosenboom et al. |
| 2008/0197802 A1 | 8/2008 | Onishi et al. |
| 2008/0223926 A1 | 9/2008 | Miller et al. |
| 2008/0258680 A1 | 10/2008 | Frerking et al. |
| 2008/0265835 A1 | 10/2008 | Reed et al. |
| 2009/0026959 A1 | 1/2009 | Lin et al. |
| 2009/0040807 A1 | 2/2009 | Doumae et al. |
| 2009/0047768 A1 | 2/2009 | Jain |
| 2009/0047769 A1 | 2/2009 | Bhat et al. |
| 2009/0075704 A1 | 3/2009 | Wang |

(56) References Cited

U.S. PATENT DOCUMENTS

| | | |
|---|---|---|
| 2009/0079387 A1 | 3/2009 | Jin et al. |
| 2009/0084705 A1 | 4/2009 | Justiss |
| 2009/0097221 A1 | 4/2009 | Sayed et al. |
| 2009/0102416 A1 | 4/2009 | Burley |
| 2009/0134972 A1 | 5/2009 | Wu, Jr. et al. |
| 2009/0146608 A1 | 6/2009 | Lee |
| 2009/0153098 A1 | 6/2009 | Toya et al. |
| 2009/0153297 A1 | 6/2009 | Gardner |
| 2009/0174263 A1 | 7/2009 | Baarman et al. |
| 2009/0203355 A1 | 8/2009 | Clark |
| 2009/0212639 A1 | 8/2009 | Johnson |
| 2009/0226050 A1 | 9/2009 | Hughes |
| 2009/0243791 A1 | 10/2009 | Partin et al. |
| 2009/0251102 A1 | 10/2009 | Hui |
| 2009/0273891 A1 | 11/2009 | Peiker |
| 2009/0278494 A1 | 11/2009 | Randall |
| 2010/0039066 A1 | 2/2010 | Yuan et al. |
| 2010/0066176 A1* | 3/2010 | Azancot ............... H02J 5/005 307/104 |
| 2013/0049482 A1* | 2/2013 | Rofe ............... H02J 50/12 307/104 |

FOREIGN PATENT DOCUMENTS

| | | |
|---|---|---|
| EP | 0558316 A1 | 9/1993 |
| EP | 1990734 A1 | 11/2008 |
| GB | 2399466 A | 9/2004 |
| GB | 2399466 B | 11/2005 |
| GB | 2429372 A | 2/2007 |
| JP | 04-156242 | 5/1992 |
| JP | 07-039078 | 2/1995 |
| JP | 07-036556 | 7/1995 |
| JP | 2001-309579 | 11/2001 |
| JP | 2001309579 | 11/2001 |
| JP | 2005-006440 | 1/2005 |
| JP | 2005-110412 | 4/2005 |
| JP | 2006-102055 | 4/2006 |
| JP | 2007-529110 | 10/2007 |
| WO | 9602879 A1 | 2/1996 |
| WO | 0201557 A1 | 1/2002 |
| WO | 0215320 A1 | 2/2002 |
| WO | 2005041281 A1 | 5/2005 |
| WO | 2005043775 A1 | 5/2005 |
| WO | 2006037972 A1 | 9/2005 |
| WO | 2006015143 A2 | 2/2006 |
| WO | 2006031133 A1 | 3/2006 |
| WO | 2008030985 A2 | 3/2008 |
| WO | 2008086080 A2 | 7/2008 |
| WO | 2008093334 A2 | 8/2008 |
| WO | 2008114268 A2 | 9/2008 |
| WO | 2009040807 A2 | 4/2009 |
| WO | 2009047768 A2 | 4/2009 |
| WO | 2009047769 A2 | 4/2009 |
| WO | 2009049657 A1 | 4/2009 |
| WO | 2009108958 A1 | 9/2009 |
| WO | 2010025156 A1 | 3/2010 |
| WO | 2010025157 A1 | 3/2010 |
| WO | 2011036659 A2 | 3/2011 |

OTHER PUBLICATIONS

Hui et al. "A New Generation of Universal Contactless Battery Charging Platform for Portable Consumer Electronic Equipment", IEEE Transactions on Power Electronics May 2005, vol. 20, No. 3, p. 620-627.

Liu et al. "Equivalent Circuit Modeling of a Multilayer Planar Winding Array Structure for Use in a Universal Contactless Battery Charging Platform", IEEE Transactions on Power Electronics Jan. 2007, vol. 22, No. 1, p. 21-29.

Tang et al. "Evaluation of the Shielding Effects on Printed-Circuit-Board Transformers Using Ferrite Plates and Copper Sheets", IEEE Transactions on Power Electronics Nov. 2002, vol. 17, No. 6, p. 1080-1088.

Su et al. "Extended Theory on the Inductance Calculation of Planar Spiral Windings Including the Effect of Double-layer Electromagnetic Shield", IEEE 2007, p. 3022-3028.

Liu et al. "Optimal Design of a Hybrid Winding Structure for Planar Contactless Battery Charging Platform", IEEE Transactions on Power Electronics Jan. 2008, vol. 23, No. 1, p. 455-463.

Liu et al. "Simulation Study and Experimental Verification of a Universal Contactless Battery Charging Platform With Localized Charging Features", IEEE Transactions on Power Electronics Nov. 2007, vol. 22, No. 6, p. 2202-2210.

International Search Report for PCT/IL2009/000915 Completed by the European Patent Office on Mar. 15, 2010, 3 Pages.

Search report and Written Opinion for PCT/IL2008/001282, Both completed by the US Patent Office on Feb. 25, 2009, 9 pages all together.

Search Report and Written Opinion for PCT/IL2008/001347, Both completed by the US Patent Office on Feb. 2, 2009, 10 Pages all together.

Search Report and Written Opinion for PCT/IL2008/001348, Both completed by the US Patent Office on Jan. 28, 2009, 9 Pages all together.

International Search Report for PCT/IL2008/01641, Completed by the US Patents and Trademark Office on May 21, 2009, 3 Pages.

Office Action dated Mar. 22, 2013, for Mexican Application MX/a/2011/003088.

Office Action dated Feb. 5, 2013, for Chinese Application 201110068458.7.

Office Action dated May 28, 2013, for Japanese Application 2010-526422.

Office Action dated May 28, 2013, for Japanese Application 2010-528526.

Office Action dated May 21, 2013, for Japanese Application 2011-500345.

International Search Report and Written Opinion for International Application No. PCT/IL2012/050491 dated May 22, 2013.

* cited by examiner

SYSTEM AND METHOD FOR REGULATING INDUCTIVE POWER TRANSMISSION

CROSS-REFERENCE TO RELATED APPLICATIONS

This application is a continuation of PCT application Serial No. PCT/IL2012/050491 filed Nov. 29, 2012, which claims the benefit of U.S. provisional application Ser. No. 61/566,103 filed Dec. 2, 2011, and a continuation-in-part of U.S. application Ser. No. 14/283,182 filed May 20, 2014, which is a continuation of U.S. application Ser. No. 12/883, 457 filed Sep. 16, 2010, which is a continuation of PCT application Serial No. PCT/IL2008/001641 filed Dec. 18, 2008, which claims the benefit of U.S. provisional application Ser. Nos. 61/064,618 filed Mar. 17, 2008; 61/071,151 filed Apr. 15, 2008; 61/129,526 filed Jul. 2, 2008; 61/129,859 filed Jul. 24, 2008; and 61/129,970 filed Aug. 4, 2008, the disclosures of all of which are hereby incorporated by reference in their entirety.

TECHNICAL FIELD

The present invention relates to regulation of power in contactless power transmission systems. More specifically, the invention relates to power regulation of inductive power transmission systems using natural frequency modulation.

BACKGROUND

Inductive power transmission systems are a convenient power provision alternative to common plug and socket power connections. Inductive power transmission allows power to be transferred from an inductive power outlet to an inductive power receiver with no connecting wires.

An oscillating electrical potential, or driving voltage, is applied across a primary inductor associated with the inductive power outlet. This produces a varying magnetic field in the vicinity of the primary inductor. When the inductive receiver is brought near to the inductive outlet, a secondary potential difference, or output voltage, is generated across a secondary inductor positioned within this varying magnetic field. The output voltage may be used to charge or power electrical devices wired to the secondary inductor.

In order to maintain a stable operating voltage for an electrical device it is necessary to regulate the output voltage from the secondary inductor. Regulation of the output voltage may be provided by monitoring the output voltage, providing feedback signals from the receiver to the outlet and controlling the driving voltage accordingly.

There is a need for a regulation system which may provide continuous regulation of power over an operating range. The disclosure herein addresses this need.

SUMMARY

It is according to one aspect of the current disclosure to present an inductive power transfer system comprising at least one inductive power receiver comprising at least one secondary inductor for forming an inductive couple with a primary inductor and providing power to an electric load; at least one inductive power outlet comprising at least one primary inductor wired to a power supply via a driver configured to provide a driving voltage across the primary inductor, the driving voltage oscillating at a transmission frequency significantly different from the natural frequency of the inductive couple; at least one power monitor; and at least one frequency modulator operable to adjust the natural frequency of the inductive couple thereby regulating power provided to the electric load.

Optionally, the frequency modulator is selected from at least one of an outlet side frequency modulator and a receiver side frequency modulator. Where appropriate the frequency modulator comprises at least one frequency modulation coil operable to modify magnetic permeability of at least one magnetic flux guide.

In various examples, the frequency modulator comprises at least one variable capacitor. Alternatively or additionally, the frequency modulator comprises at least one variable inductor.

In some embodiments, the frequency modulator may comprise at least one dimension modifier configured to modify the dimensions of at least one inductor. Alternatively or additionally, the frequency modulator comprises at least one dimension modifier configured to modify the dimensions of at least one capacitor. Optionally, the dimension modifier comprises a piezoelectric element wired to a variable DC supply.

Optionally, the dimension modifier comprises a piezoelectric element. A dimension modifier may further be any element operable to adjust the dimensions of the system in response to electrical signals such as motors, actuators, piezoelectric element, electric field generators, bimetalic strips or the like.

Where appropriate, the dimension modifier is configured to adjust distance between an inductive coil and a ferromagnetic core. Additionally or alternatively, the dimension modifier is configured to adjust distance between electrodes of the variable capacitor. Variously, the dimension modifier may be configured to adjust overlap area of electrodes of the variable capacitor.

In some embodiments the system further comprises at least one magnetic flux guide for directing magnetic flux from the primary inductor to the secondary inductor and the frequency modulator comprises at least one modulation coil wired to a variable direct current supply and operable to modify magnetic permeability of the magnetic flux guide.

Optionally, the system further comprises at least one magnetic flux guide for directing magnetic flux from the primary inductor to the secondary inductor wherein the frequency modulator comprises at least one dimension modifier configured to adjust the dimensions of a between the flux guide and at least one of the primary inductor and the secondary inductor.

Variously the system may further comprise at least one magnetic flux guide for directing magnetic flux from the primary inductor to the secondary inductor and the frequency modulator may comprise at least one modulation coil wired to a variable direct current supply and operable to modify magnetic permeability of the magnetic flux guide.

Optionally, at least one magnetic flux guide may be provided for directing magnetic flux from the primary inductor to the secondary inductor wherein the frequency modulator comprises at least one dimension modifier configured to adjust the distance between the flux guide and at least one of the primary inductor and the secondary inductor. For example, the dimension modifier may comprise at least one piezoelectric crystal coupled to the flux guide and the primary inductor and wired to a variable direct current supply such that the distance between the flux guide and the primary inductor is adjusted when the direct current supply is varied. Additionally or alternatively, the dimension modifier may comprise at least one piezoelectric crystal coupled to the flux guide and the secondary inductor and wired to a variable direct current supply such that the distance between the flux guide and the secondary inductor is adjusted when the direct current supply is varied.

Optionally, again, the system may comprise at least one capacitor wired to at least one of the primary inductor and the secondary inductor, the capacitive element comprising two capacitive plates separated by a dielectric and a dimension modifier configured to adjust the distance between the capacitive plates. Accordingly, the dimension modifier may comprise at least one piezoelectric crystal wired to a variable direct current supply and coupled to at least one capacitive plate of the capacitor such that the distance between the capacitive plates is adjusted when the direct current supply is varied.

Alternatively or additionally, the system may further comprise at least one capacitor wired to at least one of the primary inductor and the secondary inductor, the capacitive element comprising two capacitive plates separated by a dielectric and a piezoelectric element configured to adjust overlapping area of the capacitive plates.

According to another aspect of the disclosure a method is taught for regulating power transfer between an inductive power outlet and an inductive power receiver. The method comprising: transferring power to an electric load via an inductive couple; determining a required power range for the electric load; monitoring power received by the electric load; comparing monitored power received to the required power; and adjusting natural frequency of the inductive couple if the monitored power lies outside the required power range.

BRIEF DESCRIPTION OF THE DRAWINGS

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion only, and are presented in the cause of providing what is believed to be the most useful and readily understood description of the principles and conceptual aspects of the embodiments. In this regard, no attempt is made to show structural details of the embodiments in more detail than is necessary for a fundamental understanding; the description taken with the drawings making apparent to those skilled in the art how the several forms of the invention may be embodied in practice. In the accompanying drawings.

DETAILED DESCRIPTION

Figure 1B:
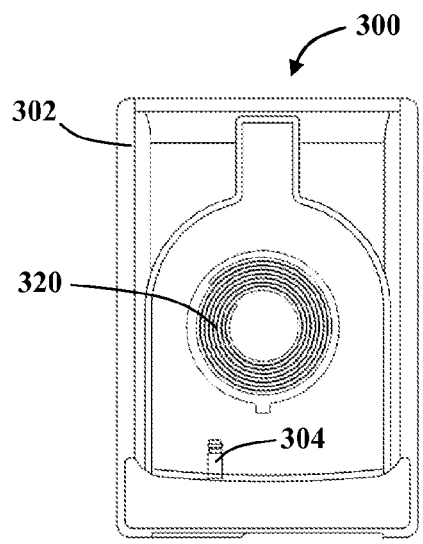
FIGS. 1A and 1B schematically represent an inductive power transmission system including an inductive power outlet and an inductive power receiver.
Figure 1A:
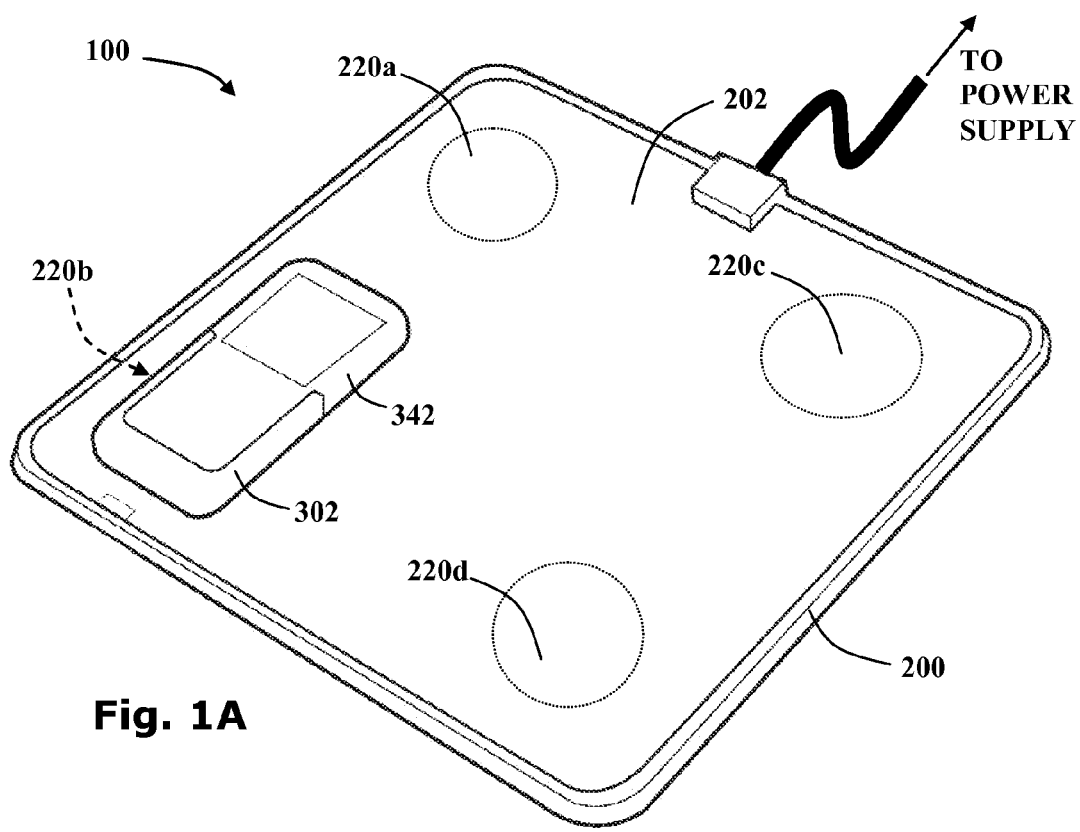

Reference is now made to FIGS. 1A and 1B showing an inductive power transmission system 100. The transmission system 100 includes an inductive power outlet 200 and an inductive power receiver 300. The inductive power outlet 200 is configured to transmit power to the inductive power receiver 300 wirelessly using electromagnetic induction.

The inductive power outlet 200 of the example, which is presented for illustrative purposes only, consists of four primary inductors 220a-d incorporated within a platform 202. The inductive power receiver 300 includes a secondary inductor 320 incorporated within a case 302 for accommodating a mobile telephone 342. When a mobile telephone 342 is placed within the case 302 a power connector 304 electrically connects the secondary inductor 320 with the mobile telephone 342. As shown in FIG. 1A, the inductive power receiver 300 may be placed upon the platform 202 in alignment with one of the primary inductors 220b so that the secondary inductor 320 inductively couples with the primary inductor 220b.

It is noted that in alternative embodiments, inductive power receivers 200 may be otherwise configured, for example being incorporated within powerpacks for charging power cells or being wired directly to electrical loads 340 for powering such loads directly. In still other embodiments of the inductive power receiver, dedicated inductive power adaptors are provided for connecting to electrical devices by power cables which may be hard wired to the adaptor or connectable via a conductive pin-and-socket connector.

Figure 1C:
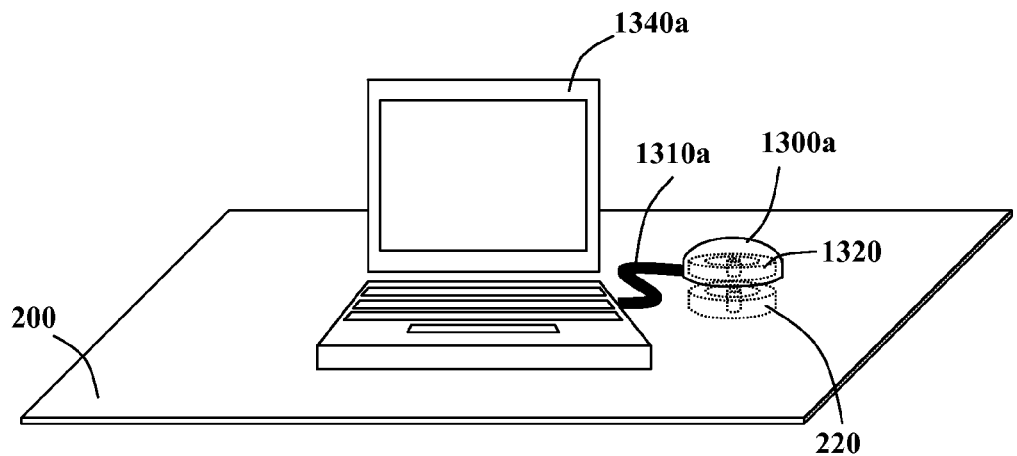
FIGS. 1C-E illustrate three possible inductive power adaptors for use as inductive power receivers in an inductive power transmission system.
Figure 1D:
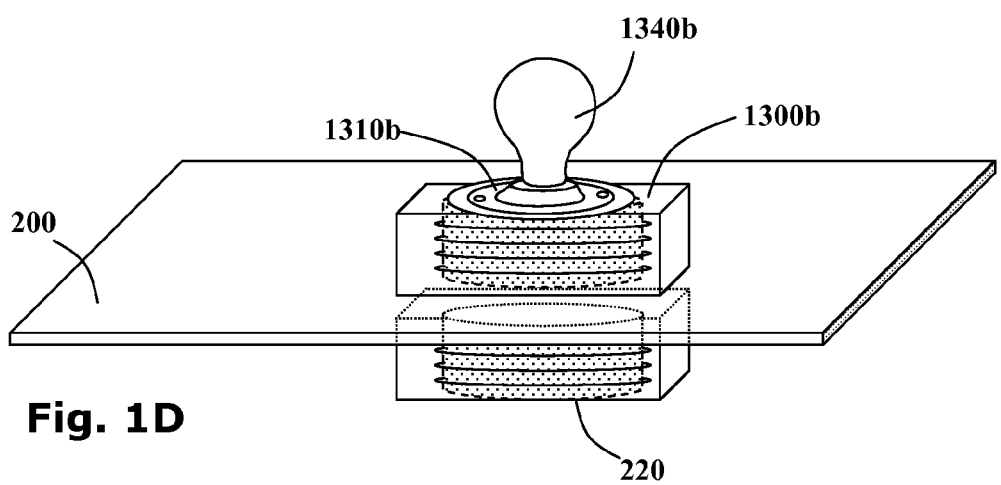
Figure 1E:
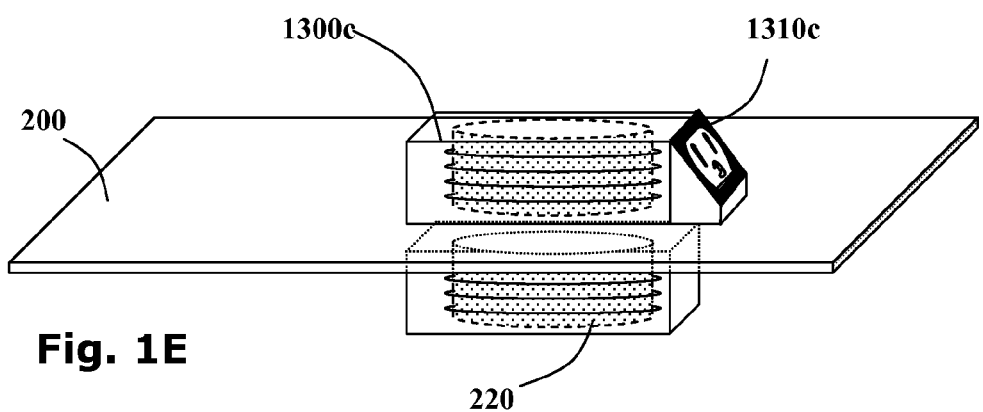

FIGS. 1C, 1D and 1E show three alternative power adaptors 1300a-c according to embodiments of the inductive power receiver 300. FIG. 1C shows a first inductive power adaptor 1300a connected to a computer 1340a via a hardwired power cable 1310a. The first inductive power adaptor 1300a draws power from an inductive power transmitter 200 via a secondary inductor 1320. FIG. 1D shows a second inductive power adaptor 1300b hardwired to a light fitting 1310b for inductively powering a light bulb 1340b. FIG. 1E, shows still a third inductive power adaptor 1300c in which a conventional mains-type power socket 1310c is providing for connecting to external electrical device (not shown) via conventional power plugs.

It will be appreciated that various embodiments of the inductive power receiver may be used to provide power to a variety of electrical devices either via adaptors or through the inductive receiver directly into the electrical devices. Thus, for example, inductive receivers may be used to power entertainment equipment such as media players, portable music players, video recorders, DVD players, portable DVD players, radios, cassette players, Walkman®s, CD players, televisions, video players, music centers and the like.

In addition, inductive receivers may be used in the work environment to power office equipment such as computers, telephones, PDAs, dictaphones, mobile communications devices, standing lamps, paper shredders, fans, photocopiers, printers, desk lamps, wireless telephones, mobile telephones, speakers, speaker phones, conference call base units, electric pencil sharpeners, electric staplers, display devices, electronic picture frames, VDUs, projectors, calculators, scanners, fax machines as well as heavy machinery and the like.

Because no conductive connections are required, inductive power transfer is particularly suited for use in wet environments. Thus in some embodiments, inductive power receivers may be used to provide power to devices used in the kitchen such as the cooking appliances, fridges, freezers, washing machines, clothes dryers, ambient lighting units, fans, hot plates, electrically heated mugs, egg beaters, breadmakers, liquidizers, citrus juice extractors, vegetable juicers, food-processors, electric knives, toasters, sandwich toasters, waffle makers, electrical barbecue grills, slow cookers, hotplates, deep-fat fryers, electrical frying pans, knife sharpeners, domestic sterilizers, kettles, urns, and electrical tinopeners, popcorn makers and magnetic stirrers and the like.

Inductive power receivers are similarly suitable for providing power to devices commonly used in the bathroom environment such as hairdryers, shavers, defoliators, delapidators, heaters, wax-melting equipment, hair curlers, beard trippers, bathroom-scales, lights and radios and such like.

Figure 2A:
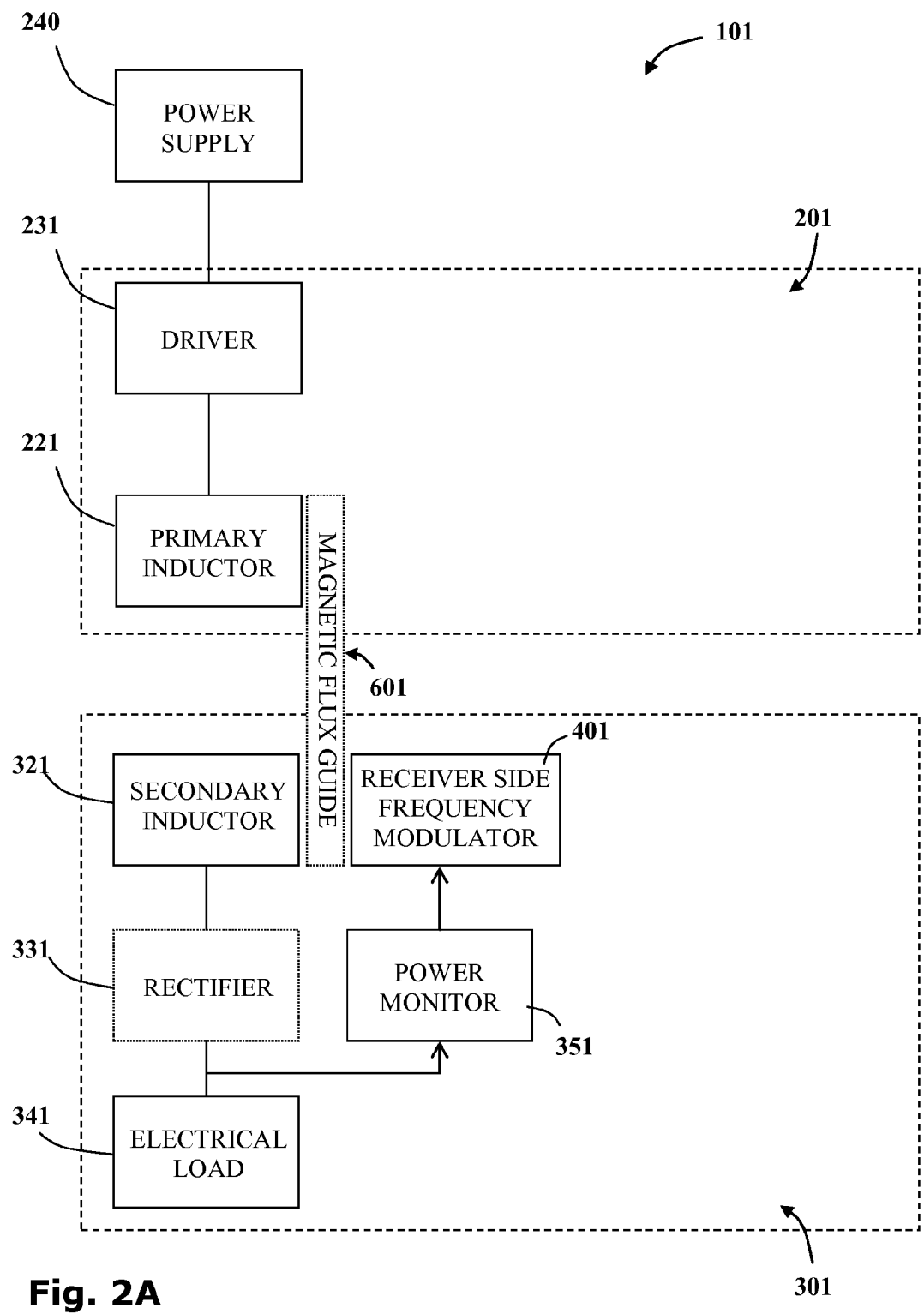
FIGS. 2A-C are block diagrams showing various possible configurations of selected components of inductive power transmission systems incorporating frequency modulation units for regulating power provided to an electrical load.
Figure 2B:
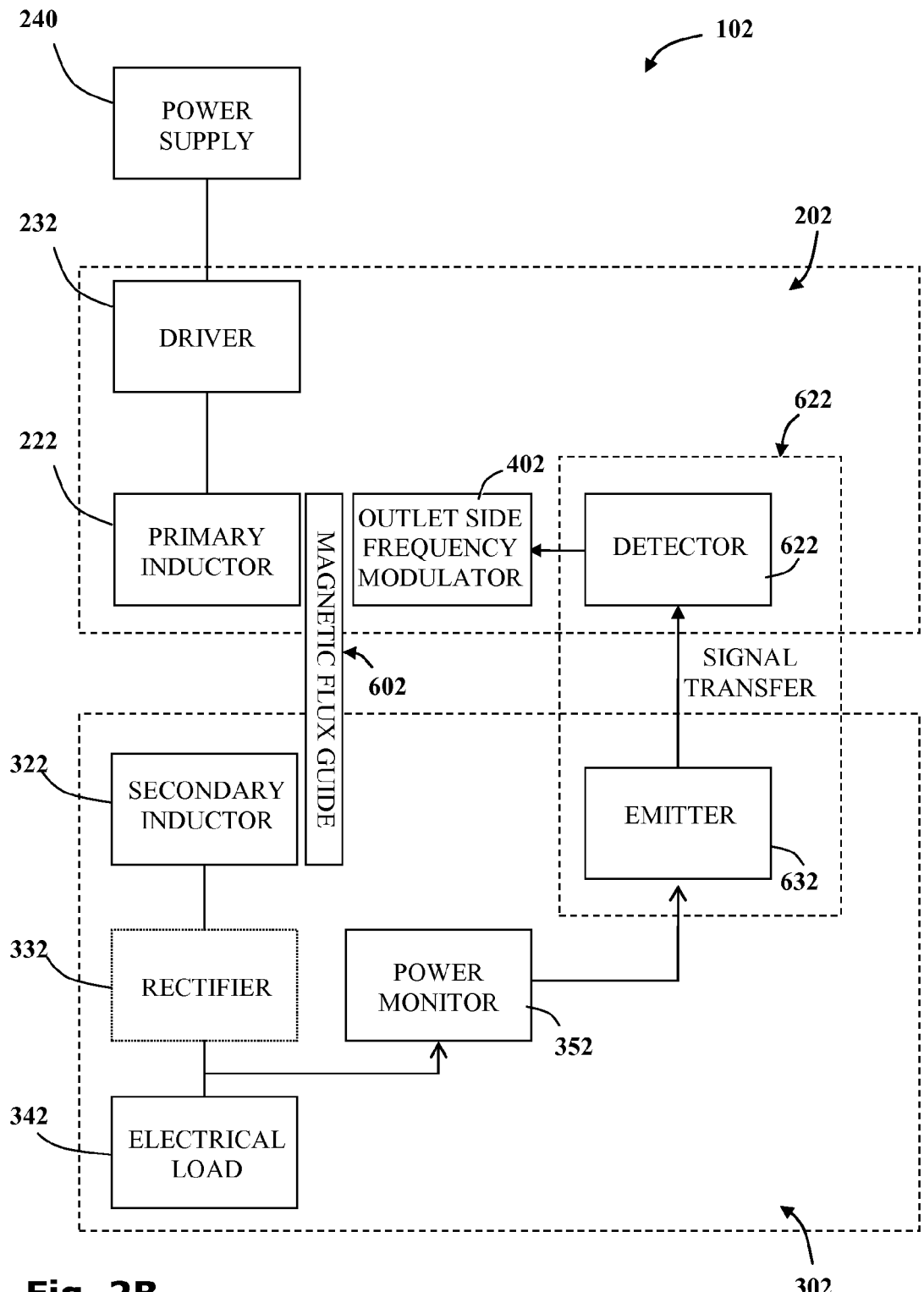
Figure 2C:
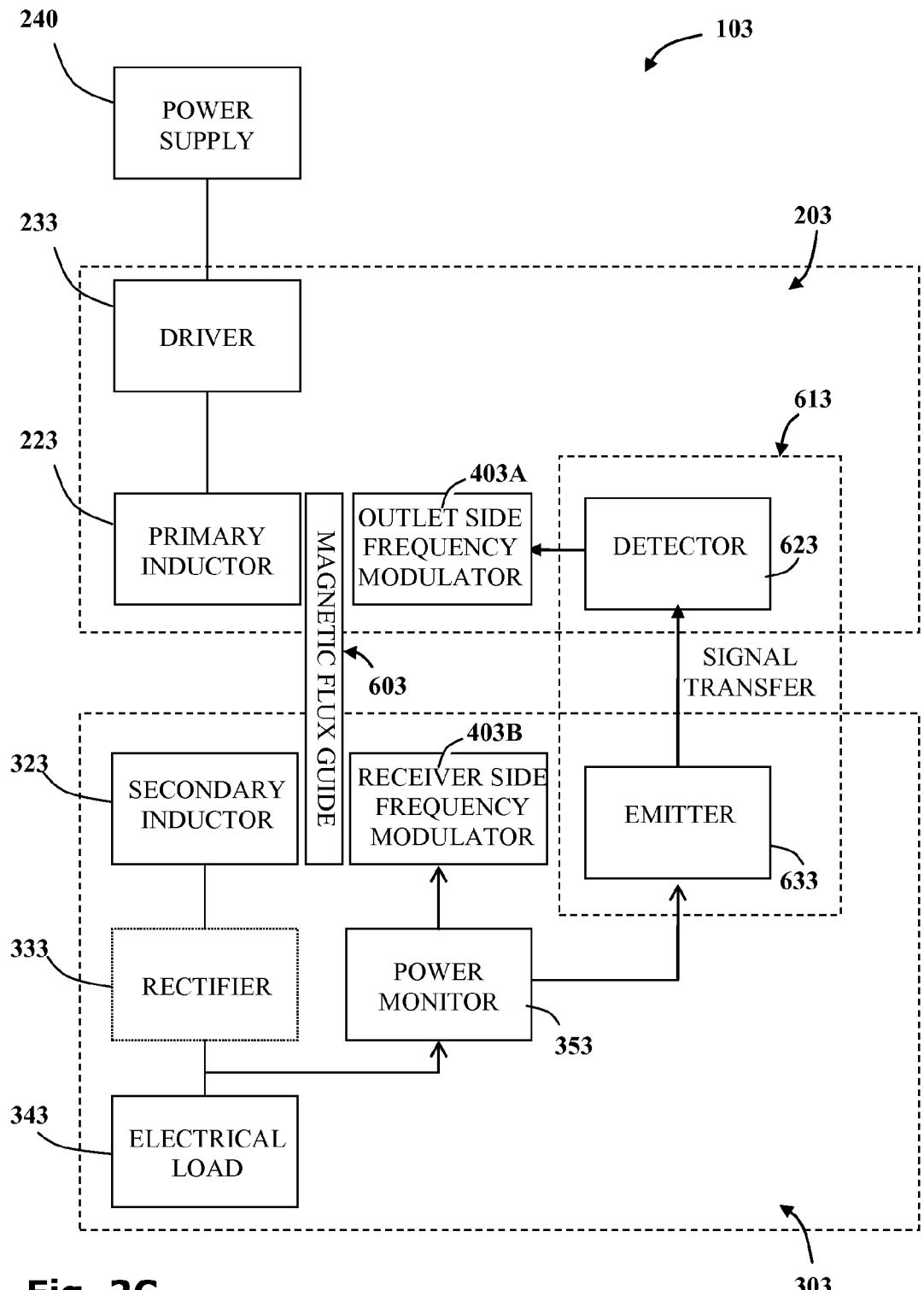

Referring now to the block diagrams of FIGS. 2A-C various possible configurations are represented for selected components of three embodiments of the inductive power transmission systems, 101, 102, 103, incorporating various frequency modulation units 401, 402, 403 for regulating power provided to an electrical load.

With particular reference to FIG. 2A, one embodiment of an inductive power transmission system 101 is shown including an inductive power outlet 201 and an inductive power receiver 301. The inductive power outlet 201 includes a primary inductor 221, wired to a power source 240 via a driver 231. It is noted that the inductive power outlet 201 may draw power from a variety of power sources 240, as will occur to those in the art, such as mains power points, power supply transformers, power packs, electrochemical cells, solar cells, fuel cells and the like. The driver 231 typically includes electronic components, such as a switching unit for example, for providing an oscillating electrical potential to the primary inductor 221. The oscillating electrical potential across the primary inductor 221 produces an oscillating magnetic field in its vicinity.

The inductive power receiver 301 includes a secondary inductor 321 wired to an electric load 341, typically via a rectifier 331, a power monitor 351 and a receiver side frequency modulator 401. The secondary inductor 321 is configured such that, when placed in the oscillating magnetic field of an active primary inductor 221, a secondary voltage is induced across the secondary inductor 321. Optionally a magnetic flux guide 601 may be provided to improve inductive coupling between the primary inductor 221 and the secondary inductor 321. The secondary voltage may be used to power the electric load 341. It is noted that an induced secondary voltage across the secondary inductor 321 produces an alternating current (AC). Where the electric load 341 requires direct current (DC), such as for charging electrochemical cells, the rectifier 331 may be provided to convert AC to DC. Where AC output is required, such as in the inductive power adaptor 1300c (FIG. IE) used for providing a mains-type output, an AC-AC converter (not shown) may be further provided.

The receiver side frequency modulator 401 is operable to adjust the natural frequency of the inductive power transmission system 101. For example, the frequency modulator 401 may variously effect the natural frequency by altering the dimensions of the secondary inductor 321, altering the permeability of the magnetic flux guide 601, changing the inductance or capacitance of the reception circuit or otherwise adjusting resonant frequency of the inductive system. Various examples of frequency modulators are described herein which may be used as receiver side frequency modulators 401 in such an inductive power transfer system 101.

The power monitor 351 and receiver side frequency modulator 401 may be used in combination to regulate the power delivered to the electric load 341. The power monitor 351 is configured to directly monitor the output voltage produced by the secondary inductor 321 and to compare the monitored output value with the operating voltage required by the electric load 341. The receiver side frequency modulator 401 may be operable to bring the monitored output voltage closer to the required operating voltage of the electric load 341 by adjusting the natural frequency of the inductive transmission system 101. Optionally the monitor may be further configured to monitor additional operating parameters, such as temperature, current and the like.

An alternative inductive power transmission system 102 is represented by the block diagram of FIG. 2B. The inductive power transmission system 102 of the embodiment includes an inductive power outlet 202 and an inductive power receiver 302 and a signal transfer system 612 providing a communication channel therebetween. It is noted that the inductive outlet 202 further includes an outlet side frequency modulator unit 402, for adjusting the natural frequency of the inductive power transmission system 102.

The inductive power outlet 202 includes a primary inductor 222, wired to a power source 240 via a driver 232 and further includes the outlet side frequency modulator unit 402 and a signal detector 622.

The inductive power receiver 302 includes a secondary inductor 322 wired to an electrical load 342 via rectifier 332 and a power monitor 352. The inductive power receiver 302 further includes a signal emitter 632 for sending signals to the signal detector 622. Optionally a magnetic flux guide 602 may be provided to improve inductive coupling between the primary inductor 222 and the secondary inductor 322.

The power monitor 352, the signal transfer system 612 and outlet side frequency modulator 402 may be used in combination to regulate the power delivered to the electric load 342. The power monitor 352 is configured to directly monitor the output voltage produced by the secondary inductor 322 and to compare the monitored output value with the operating voltage required by the electric load 342. The signal transfer system 612 may be used to communicate signals between the inductive power receiver 302 and the inductive power outlet 202 pertaining to power regulation. Accordingly, the outlet side frequency modulator 402 may be operable to bring the monitored output voltage closer to the required operating voltage of the electric load 342 by adjusting the natural frequency of the inductive transmission system 102. Where appropriate, the signal transfer system 612 may communicate instruction signals to the inductive power outlet such as described, for example, in U.S. application Ser. No. 13/205,672, which is incorporated herein by reference.

It is noted that various signal transfer systems 612 may be used such as combinations of optical, inductive, ultrasonic signal emitters or the like and their associated detectors as well as coil-to-coil signal transmission systems. It is particularly noted that although a separate emitter 632 and secondary inductor 322 are indicated in the block diagram, the secondary inductor 322 may itself serve as a signal emitter. Similarly, although a separate detector 622 and primary inductor 222 are indicated in the block diagram, the primary inductor 222 may itself serve as a signal detector. Such a coil-to-coil signal transmission system is described for example in U.S. application Ser. No. 12/563,544, which is incorporated herein by reference.

Furthermore, the signal transfer system may additionally be used to communicate other signals for a variety of functions such as inter alia, confirming the presence of a power receiver 302, communicating an identification signal or for communicating required power transmission parameters. The latter being particularly useful in systems adapted to work at multiple power levels.

Still a further inductive power transmission system 103 is represented in the block diagram of FIG. 2C. The inductive power transmission system 103 of the embodiment includes an inductive power outlet 203 and an inductive power receiver 303 and a signal transfer system 613 providing a communication channel therebetween. The inductive power outlet 203 includes a primary inductor 223, wired to a power source 240 via a driver 233 and further includes the outlet side frequency modulator unit 403 and a signal detector 623. The inductive power receiver 303 includes a secondary inductor 323 wired to an electrical load 343 via rectifier 333 and a power monitor 353. The inductive power receiver 303 further includes a signal emitter 633 for sending signals to the signal detector 623. Optionally a magnetic flux guide 603 may be provided to improve inductive coupling between the primary inductor 223 and the secondary inductor 323.

It is particularly noted that the inductive outlet 203 includes an outlet side frequency modulator unit 403A and the inductive receiver 303 includes an outlet side frequency modulator unit 403B for adjusting the natural frequency of the inductive power transmission system 103. Accordingly, the power monitor 353, the signal transfer system 613, the outlet side frequency modulator 403 A, and the receiver side frequency modulator 403B may be used in combination to regulate the power delivered to the electric load 343.

Figure 3A:
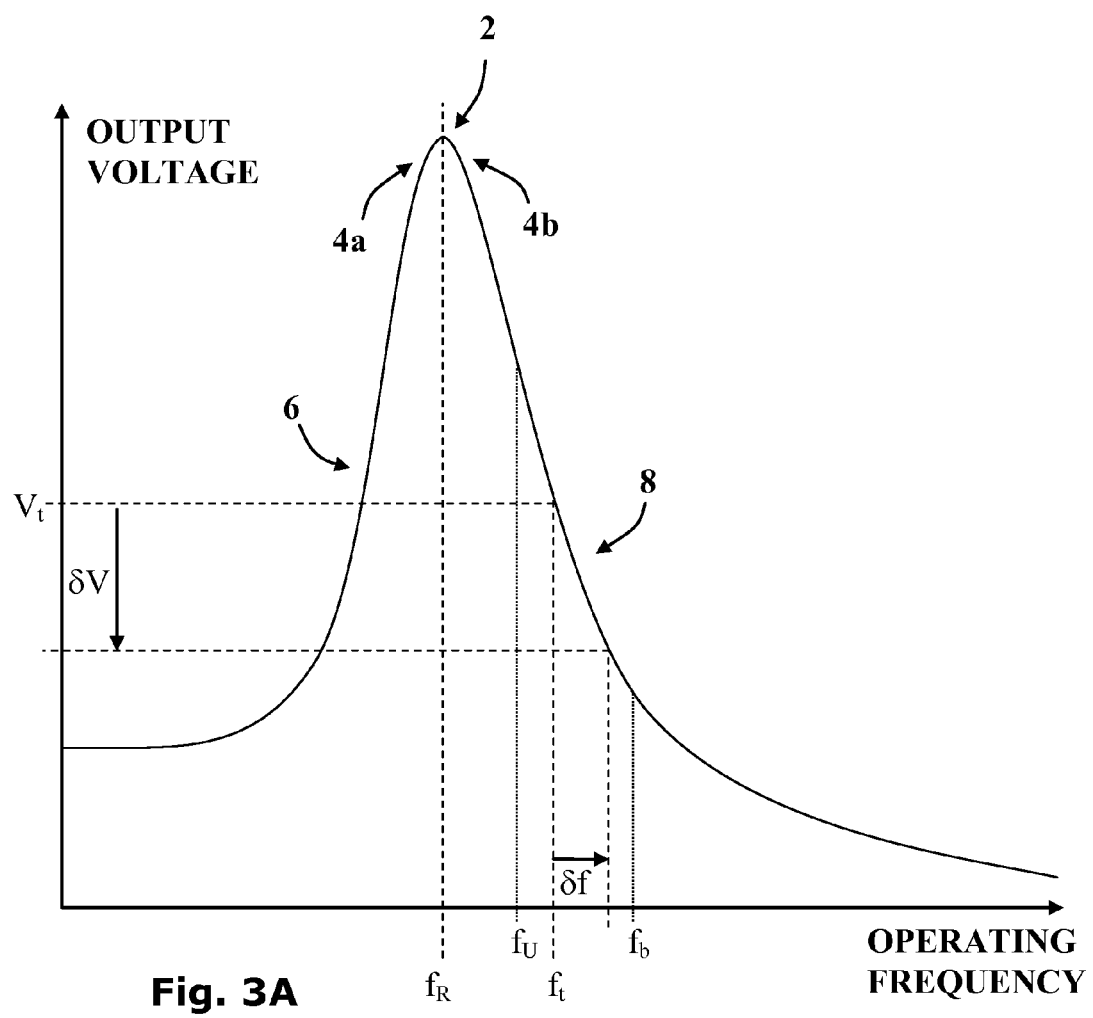
FIG. 3A is a graph showing the profile of output voltage induced in a secondary inductor over a range of transmission frequencies for an LC circuit having a fixed natural frequency and how the output voltage may be altered by adjusting transmission frequency of input voltage across a primary inductor.

Reference is now made to the graph of FIG. 3A. The graph demonstrates the profile of output voltage induced in a secondary inductor over a range of transmission frequencies for an LC circuit having a fixed natural frequency $f_R$. The profile demonstrates how the output voltage may be altered by adjusting transmission frequency $f_t$ of input voltage across a primary inductor.

The strength of an induced voltage in the secondary inductor of an inductive couple varies according to the oscillating frequency of the electrical potential provided to the primary inductor. The induced voltage is strongest when the oscillating frequency equals the resonant frequency of the system. The resonant frequency $f_R$ depends upon the inductance L and the capacitance C of the system according to the equation $$f_R = \frac{1}{2\pi\sqrt{LC}}.$$

The amplitude of the voltage is at its highest when the transmission frequency is equal to the resonant frequency $f_R$ of the system, this maximum amplitude is known as the resonance peak 2. It is further noted that the slope of the graph is steepest in the regions 4a, 4b to either side of the resonance peak 2. Thus in inductive transfer systems, which operate at or around resonance, a small variation in frequency results in a large change in induced voltage. Similarly, a small change in the resonant frequency of the system results in a large change in the induced voltage. For this reason resonant inductive transfer systems may be very sensitive to small fluctuations in environmental conditions or variations in alignment between the induction coils.

In non-resonant inductive transfer systems, such as described in U.S. application Ser. No. 12/563,544, the transmission frequency may be used to regulate the inductive power transfer. The transmission frequency may be selected to lie within one of the near-linear regions 6, 8 where the slope of the frequency-amplitude graph is less steep. For example, the frequency of transmission $f_t$ may be selected to be in the approximately linear region 8 of the curve between a lower frequency value of $f_L$ and an upper frequency value of $f_U$. Accordingly, the transmission frequency $f_t$, higher than the resonant frequency $f_R$ of the system, produces an induced voltage of $V_t$. The induced voltage may be increased by reducing the transmission frequency and the induced voltage may be reduced by increasing the transmission frequency. For example, an increase in transmission frequency of $\delta i$ produces a decrease in induced voltage of $\delta v$.

In other non-resonant inductive transfer systems, induced power may be regulated by adjusting the natural frequency of the LC circuit for a fixed transmission frequency. Referring now to the graph of FIG. 3B, the shift in output voltage profile of an LC circuit is illustrated when the natural frequency of the system is altered from a lower value $f_R$ to a higher value $f_R'$. The output voltage peaks when the operating frequency is equal to the natural frequency $f_R$, $f_R'$ of the system. The full line A represents the voltage profile for the reception circuit with no resonance-altering component connected. The dashed line B represents the voltage profile for the reception circuit with a resonance-altering component connected such that the resonant frequency of the system increases from $f_R$ to $f_R'$. Such an increase may be effected, for example, by using a frequency modulator such as described herein above in reference to FIGS. 2A-C.

It is noted that, for a transmission frequency $f_t$ above the resonant frequency $f_R$ of the system, the output voltage $V_t$ may be increased by increasing the resonant frequency of the system. Thus, if a frequency modulator increases the natural frequency of the system, an output voltage at a certain value $V_t$ may rise to a higher value $V_t'$. Similarly, if a frequency modulator decreases the natural frequency of the system, the voltage profile may be shifted down and the output voltage may decrease. A power regulator may therefore use a frequency modulator to regulate induced power.

Figure 3B:
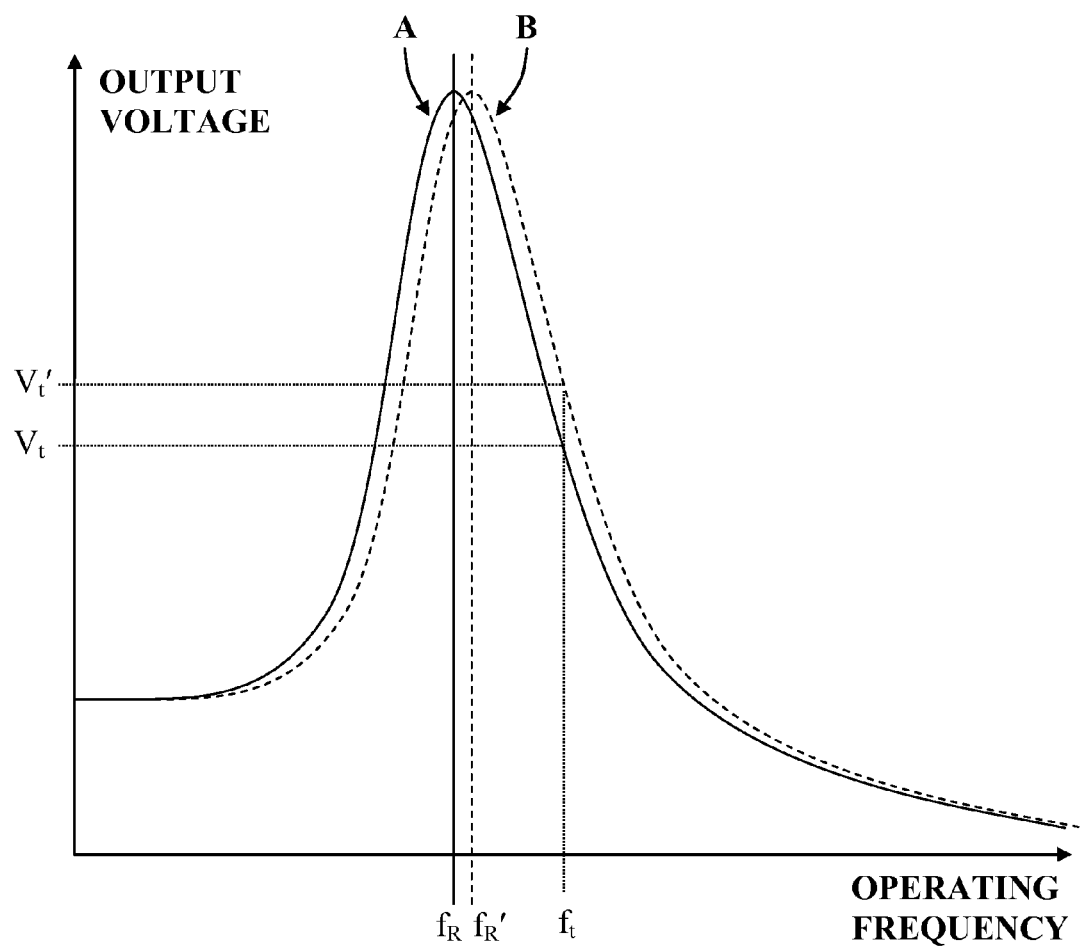
FIG. 3B is a graph showing the output voltage profile of an LC circuit for a fixed transmission frequency may be altered by adjusting natural frequency of the circuit and how the output voltage may be altered accordingly.

The embodiments described in relation to FIG. 3B relate to inductive power transmission systems which operate at a transmission frequency $f_R$ higher than the resonant frequency $f_t$ of the system. It will be appreciated that other embodiments may operate at transmission frequencies lower than the resonant frequency $f_t$ of the system. Where the operating frequency is lower than the resonant frequency $f_R$, the regulator may be configured to introduce resonance reducing elements into the reception circuit in order to increase the output voltage and introduce resonance increasing elements into the reception circuit in order to reduce the output voltage.

Figure 4:
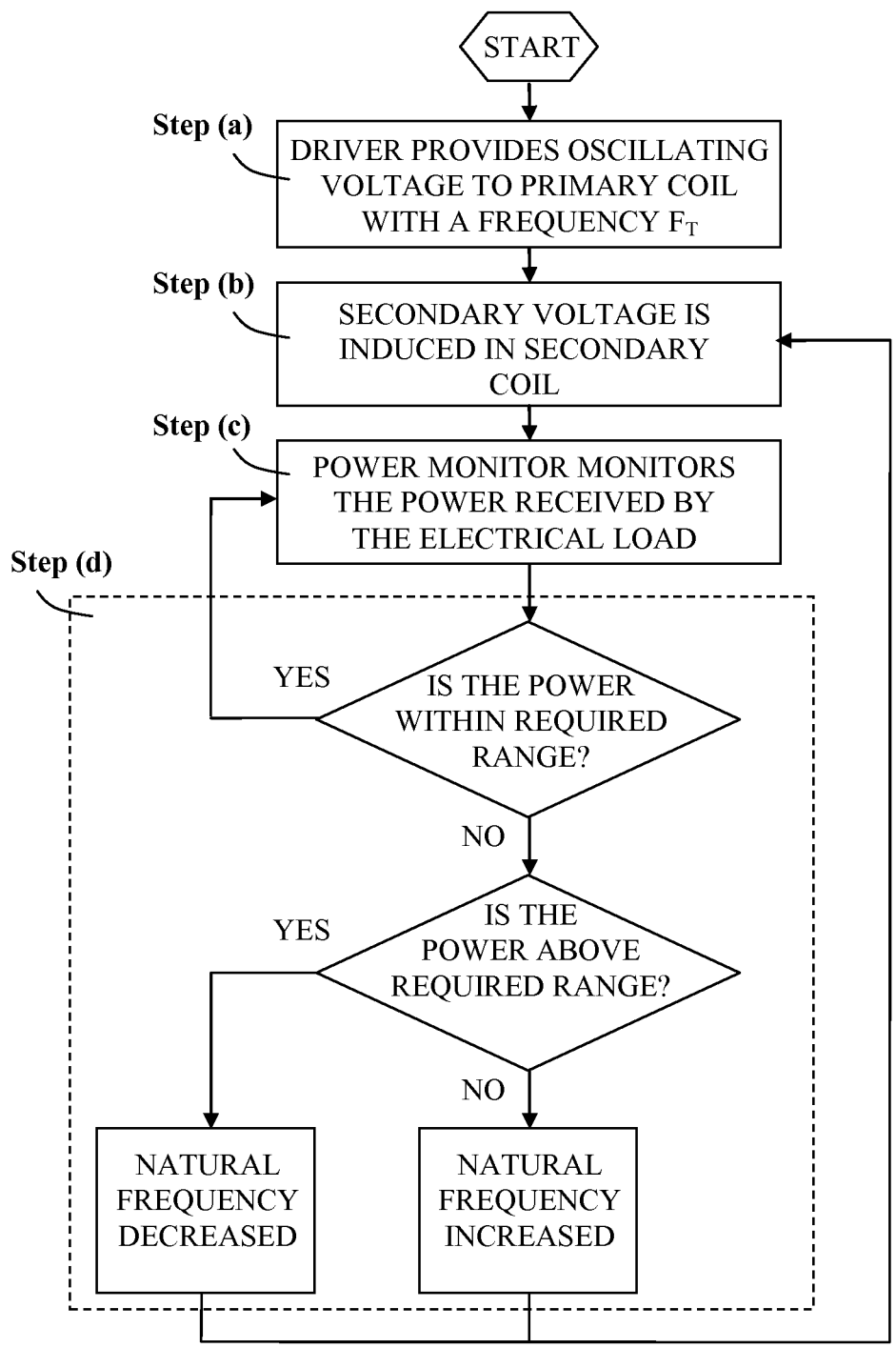
FIG. 4 is a flowchart of a method for regulating inductive power transfer using a receiver based regulator.

By way of illustration, the flowchart of FIG. 4 represents a possible method for regulating inductive power transfer using a frequency modulator. The method includes: driving a primary inductor at a transmission frequency significantly different from a first resonant frequency of the inductive power transfer system—step (a), inducing a secondary voltage across a secondary inductor associated with the reception circuit—step (b), monitoring the output voltage from the reception circuit—step (c).

The monitored power may be compared to a required range—step (d). For example a power monitor may compare the power delivered to the electric load to predetermined reference values or to reference values calculated on the fly according to varying requirements of the load. If the power lies within a required range then the natural frequency is not adjusted and the monitor continues to monitor the output voltage. If the power does not lie within the required range the frequency modulator may be used to adjust the natural frequency of the LC circuit as required.

For example, if the output voltage drops below a first reference value, a first resonance-altering component to the reception circuit may be introduced such that the resonant frequency of the inductive power transfer system shifts closer to the transmission frequency, whereas if the output voltage rises above a second reference value, a second resonance-altering component may be introduced such that the resonant frequency of the inductive power transfer system shifts away from the transmission frequency. Alternatively, or additionally, the frequency modulator may disconnect the secondary inductor from the reception circuit as required.

Referring back to FIGS. 2A-C, it is noted that various frequency modulation units 401, 402, 403 may be incorporated into the system in order to adjust the natural frequency, discretely or continuously, in order to regulate the power provided to the electric load 341, 342, 343. In order to better describe the disclosure and for illustrative purposes a number of embodiments of the frequency modulation units are described below. It is to be understood that other frequency modulation units may be alternatively used as suit requirements.

Figure 5A:
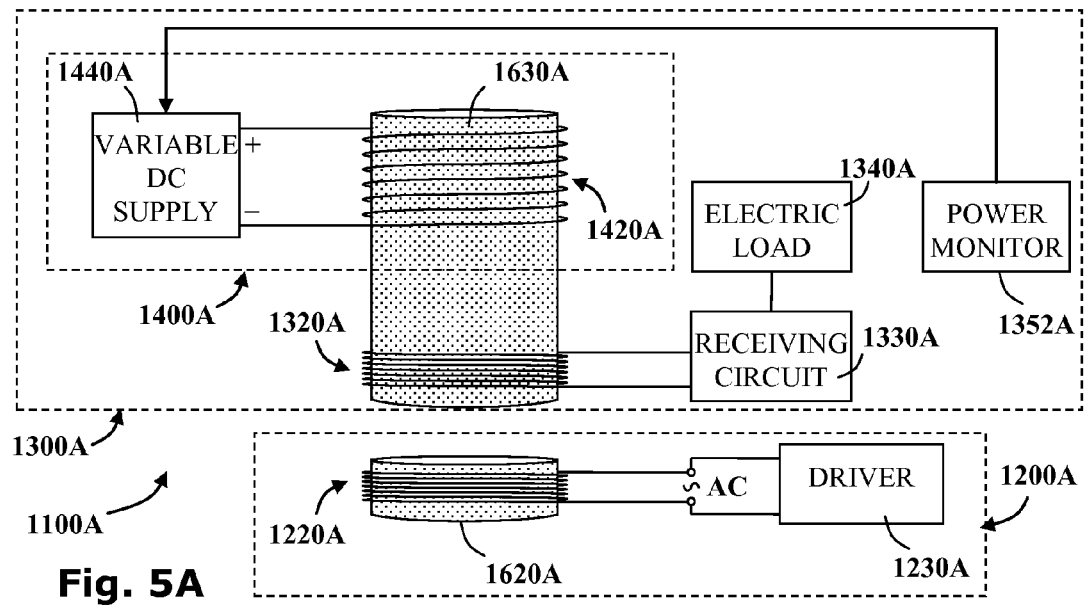
FIGS. 5A and 5B schematically represent inductive transfer systems including possible frequency modulation coils operable to modify the magnetic permeability of the magnetic flux guide.
Figure 5B:
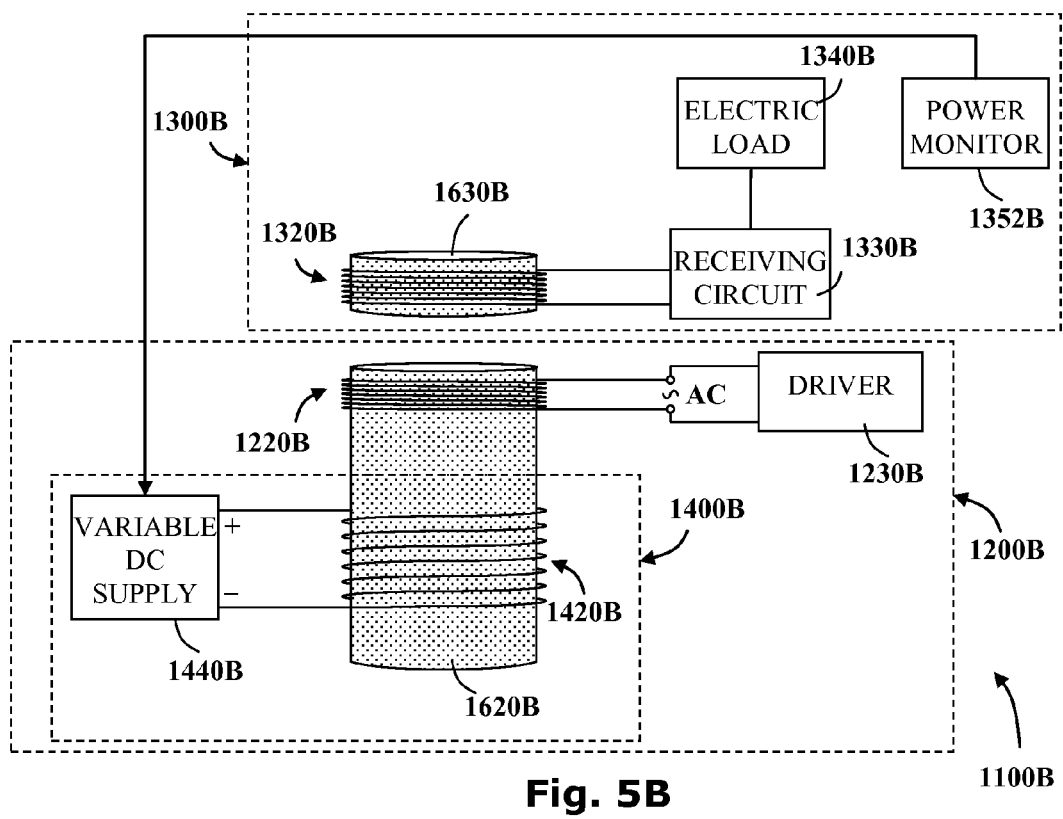

Referring now to FIGS. 5A and 5B, schematic representations are presented of embodiments of inductive transfer systems which include frequency modulation coils 1420 A, 1420B operable to modify the magnetic permeability of the magnetic flux guide between the primary and secondary inductors.

With particular reference to FIG. 5A, an inductive transfer system 1100A is presented including a receiver side frequency modulator 1400A. The inductive transfer system 1100A includes an inductive outlet 1200A and an inductive receiver 1300A. The inductive outlet 1200A comprises a driver 1230A operable to produce an alternating current potential across a primary inductor 1220A. The primary inductor 1220A may be wound around a first ferromagnetic core 1620A which forms a primary side flux guide for shaping the magnetic field produced by the primary inductor and directing the flux lines towards the secondary inductor 1320A of the inductive receiver 1300A. The inductive receiver 1300A comprises a secondary inductor 1320A, a second ferromagnetic core 1630A, a receiving circuit 1330A, an electric load 1340A, a power monitor 1352A and a receiver side frequency modulator 1400A. The secondary inductor 1320A may be wound around the second ferromagnetic core 1630A which forms a secondary flux guide directing magnetic flux from the primary inductor 1220A therethrough. The electric load 1340A is wired to the secondary inductor 1320A and is operable to draw power therefrom via the receiving circuit 1330A, which may include inter alia a rectifier unit, smoothing capacitors and such like. The power monitor 1352A is operable to monitor power received by the electric load 1340A and to control the receiver side frequency modulator 1400A to regulate power delivered to the electric load 1340A by adjusting the permeability of the secondary ferromagnetic core 1630A.

It is noted that the inductance of the coupled system depends upon the inductance of the primary inductor and the inductance of the secondary inductor. The inductance of a solenoid, such as the primary inductor or secondary inductor depends upon the relative permeability of the magnetic core. It is noted that the receiver side frequency modulator 1400A is operable to adjust the natural frequency of the coupled system by altering the permeability of the secondary flux guide 1630A.

The receiver side frequency modulator 1400A includes a receiver side frequency modulation coil 1420A and a variable DC power supply 1440A. The receiver side frequency modulation coil 1420A is wound around the secondary flux guide 1630A and wired to the variable DC power supply 1440A. It is noted that by applying a DC potential across the receiver side frequency modulation coil 1420A, the effective permeability of the flux guide may be altered. This may occur at least in part because the flux guide may become magnetically saturated thereby.

Accordingly, the DC potential may be adjusted in response to input from the power monitor such that the natural frequency of the system may be altered. As described herein, the power provided to the electric load may therefore be regulated by thus altering the natural frequency of the coupled system.

It is particularly noted that a continuous variable DC supply may be used together with the frequency modulation coil 1420A to provide continuous modulation of the natural frequency over an operating range. Alternatively, or additionally, the frequency modulation coil 1420A may provide discrete modulation where this may suit requirements.

Referring now to FIG. 5B, an alternative inductive transfer system 1100B is presented including an outlet side frequency modulator 1400B. The inductive transfer system 1100B includes an inductive outlet 1200B and an inductive receiver 1300B. The inductive outlet 1200B comprises a driver 1230B operable to produce an alternating current potential across a primary inductor 1220B and an outlet side frequency modulator 1400B operable to modulate the natural frequency of the coupled system. The primary inductor 1220B may be wound around a first ferromagnetic core 1620B which forms a primary side flux guide for shaping the magnetic field produced by the primary inductor and directing the flux lines towards the secondary inductor 1320B of the inductive receiver 1300B. The inductive receiver 1300B comprises a secondary inductor 1320B, a second ferromagnetic core 1630B, a receiving circuit 1330B, an electric load 1340B, a power monitor 1352B. The secondary inductor 1320B may be wound around the second ferromagnetic core 1630B which forms a secondary flux guide directing magnetic flux from the primary inductor 1220B therethrough. The electric load 1340B is wired to the secondary inductor 1320B and is operable to draw power therefrom via the receiving circuit 1330B, which may include inter alia a rectifier unit, smoothing capacitors and such like. The power monitor 1352B is operable to monitor power received by the electric load 1340B and to communicate with the outlet side frequency modulator 1400B, for example via a communication channel such as a signal transfer system 612 (FIG. 2B) or the like, in order to regulate power delivered to the electric load 1340B by adjusting the permeability of the primary ferromagnetic core 1620B.

It is noted that the outlet side frequency modulator 1400B is operable to adjust the natural frequency of the coupled system by altering the permeability of the secondary flux guide 1620B.

The outlet side frequency modulator 1400B may include an outlet side frequency modulation coil 1420B and a variable DC power supply 1440B. The outlet side frequency modulation coil 1420B may be wound around the primary flux guide 1620B and wired to the variable DC power supply 1440B. It is noted that by applying a DC potential across the receiver side frequency modulation coil 1420B, the effective permeability of the flux guide may be altered. Accordingly, the DC potential may be adjusted in response to input from the power monitor such that the natural frequency of the system may be altered. As described herein, the power provided to the electric load may therefore be regulated by thus altering the natural frequency of the coupled system.

As noted above, frequency modulators may be operable to effect the natural frequency by altering the configuration or dimensions of elements, such as inductors or capacitors of the LC circuit of the coupled system. Accordingly, a configuration modifier may be introduced, for example, to adjust the distance between the primary and secondary inductors. Where appropriate the primary inductor may be mounted upon a travelling platform operable to shift the primary inductor radially, longitudinally or laterally relative to the secondary inductor.

Additionally or alternatively, a dimension modifier may be introduced to alter the dimensions of the inductors, capacitors or their configuration in the system. Various dimension modifiers may be used as suit requirements, for example, a dimension modifier may be any element operable to adjust the dimensions of the system in response to electrical signals such as motors, actuators, piezoelectric element, electric field generators, bimetalic strips or the like.

Figure 6A:
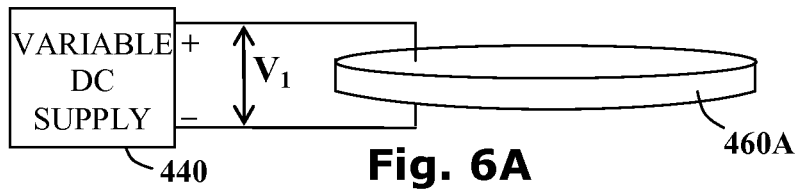
FIGS. 6A-C schematically represent a piezoelectric crystal element which may be used as a dimension modifier in various frequency modulators of the disclosure.
Figure 6B:
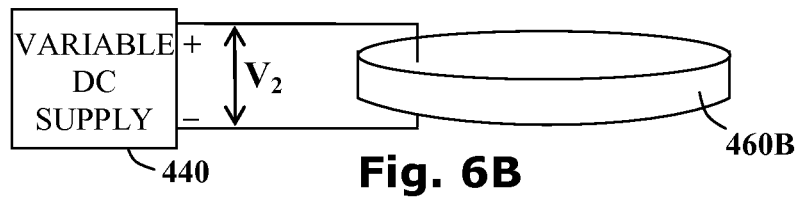
Figure 6C:
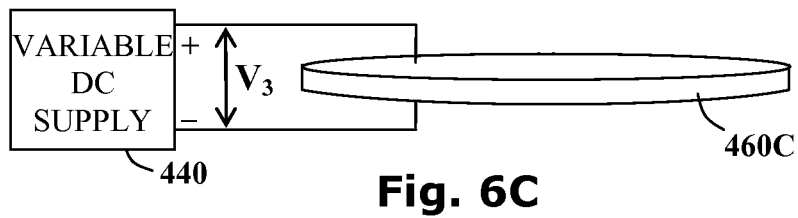

By way of example only, such dimension adjustments may be effected using a piezoelectric crystal configured to change shape depending upon a potential difference applied thereacross. FIGS. 6A-C illustrates such a piezoelectric crystal element 460A-C in a variety of configurations. Piezoelectric crystal elements such as this may be used as dimension modifiers in various frequency modulators.

FIGS. 6A-C show the piezoelectric element 460A wired to a variable DC supply 440. The dimensions of the piezoelectric element 460A change as the variable DC supply 440 applies different voltages thereacross. Accordingly, as illustrated in FIG. 6A, the crystal may have a first width and thickness when a first voltage $V_1$ is applied thereacross. As shown in FIG. 6B, the width may be reduced and thickness increased by applying a second voltage $V_2$ thereacross. As shown in FIG. 6C, the width may be increased and thickness decreased by applying a third voltage $V_3$ thereacross.

Figure 7A:
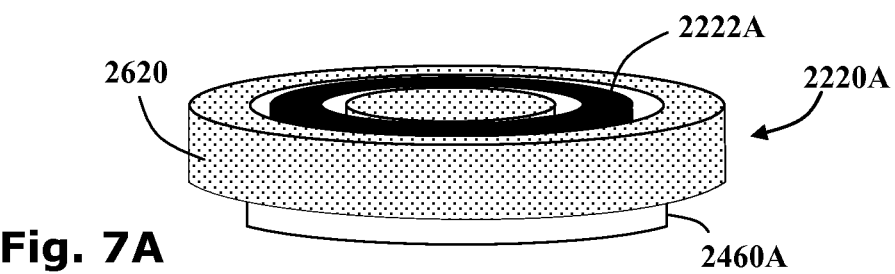
FIG. 7A-C schematically represents a frequency modulator incorporating a spacer configured to shift an inductive coil along the axis of a magnetic core so as to adjust the natural frequency of an inductive circuit.
Figure 7B:
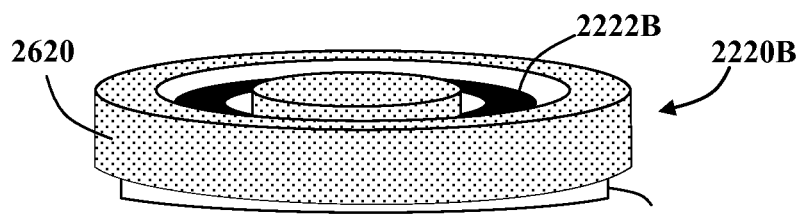
Figure 7C:
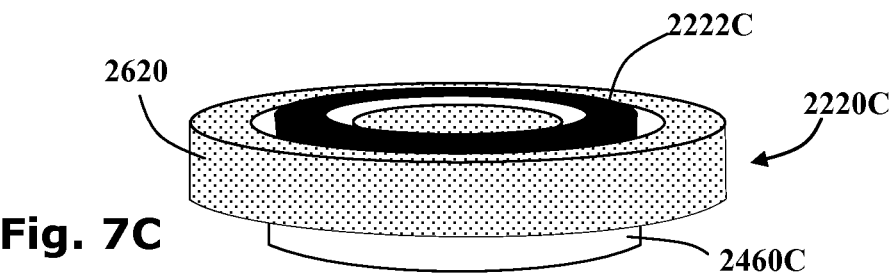

Referring now to FIGS. 7A-C, a variable inductor 2220A-C is illustrated incorporating a dimension modifier 2460A-C such as a piezoelectric element or the like. Such a variable inductor 2220A-C may be incorporated into a frequency modulator such as described herein and used to modulate the natural frequency of the system so as to regulate power transfer to an electric load as described hereinabove. The variable inductor 2220A-C includes an inductive coil 2222A-C and a flux guide 2620, such as a ferromagnetic core or the like. The inductive coil 2222A-C may be coupled to the dimension modifier 2460A-C such that as the dimensions of the dimension modifier 2460A-C are adjusted, the inductive coil 2222A-C moves relative to the flux guide 2620, thereby altering the inductance of the variable inductor 2220A-C.

Figure 8A:
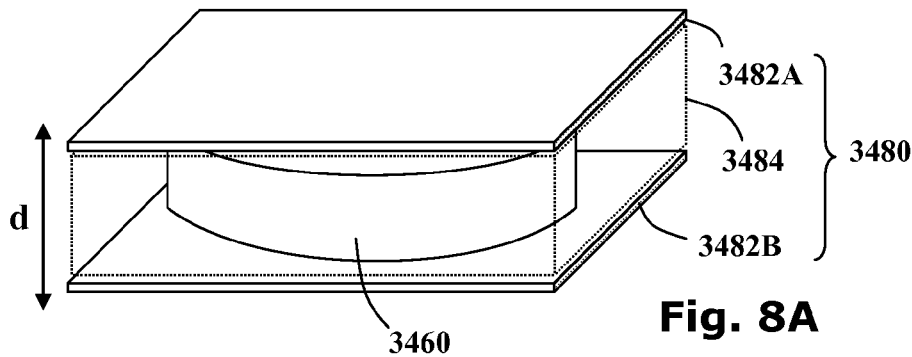
FIGS. 8A and 8B schematically represent two possible frequency modulators incorporating a dimension modifier configured to shift parallel plates of capacitors so as to adjust the natural frequency of an LC circuit.

Referring now to FIG. 8A, a first variable capacitor 3480 is illustrated incorporating a dimension modifier 3460 such as a piezoelectric element or the like. Such a variable capacitor 3480 may be incorporated into a frequency modulator such as described herein and used to modulate the natural frequency of the system so as to regulate power transfer to an electric load as described hereinabove.

The variable capacitor 3480 includes two electrode plates 3482A, 3482B separated by a dielectric layer 3484 and a dimension modifier 3460. The dimension modifier 3460 may be used to control the separation distance d between the electrode plates and may be adjusted as required. Optionally, the dimension modifier 3460 may be introduced into the gap between the electrode plates 3482A, 3482B, for example where the dielectric layer 3484 itself comprises a dimension modifying material.

Figure 8B:
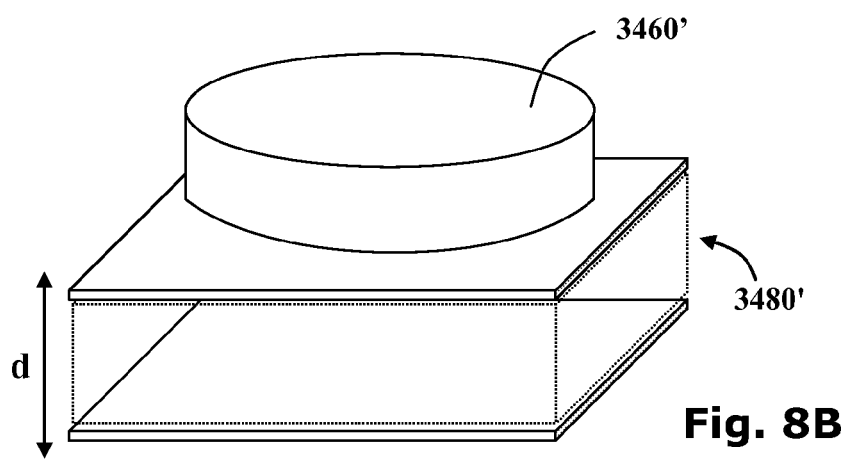

Referring now to FIG. 8B, alternatively, or additionally, a second variable capacitor 3480' is illustrated incorporating a dimension modifier 3460' as shown in FIG. 8B. The dimension modifier 3460' of the second variable capacitor 3480' is positioned outside the electrode plates and coupled thereto so as to adjust the separation distance d as required.

Figure 9:
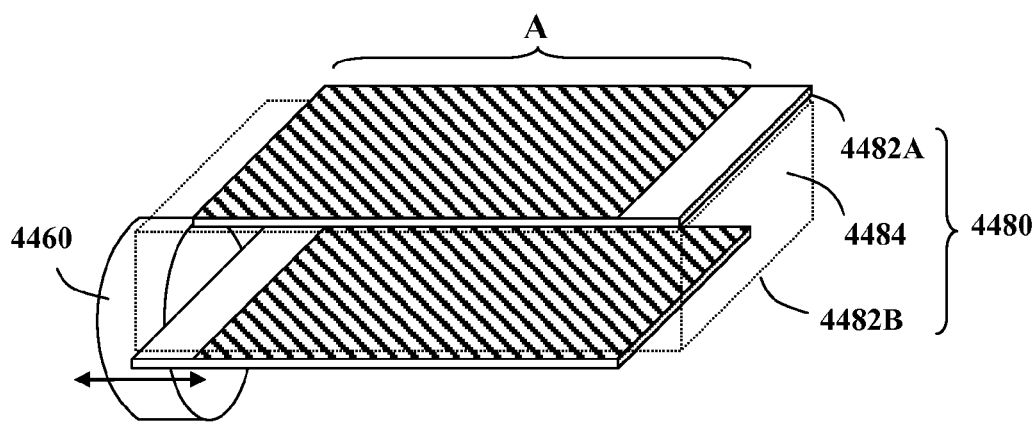
FIG. 9 represents a third variable capacitor.

With reference to FIG. 9, a third variable capacitor 4480 is represented incorporating a dimension modifier 4460 such as a piezoelectric element or the like. The third variable capacitor 4480 may be incorporated into a frequency modulator such as described herein and used to modulate the natural frequency of the system so as to regulate power transfer to an electric load as described hereinabove.

The third variable capacitor 4480 includes two electrode plates 4482A, 4482B separated by a dielectric layer 4484 and a dimension modifier 4460. The dimension modifier 4460 may be coupled to one of the electrode plates 4482B such that it may be shifted laterally relative to the other plate 4482A thereby controlling the overlapping area A of the electrode plates. Accordingly, the capacitance of variable capacitor may be adjusted as required.

Still further frequency modulators will occur to those skilled in the art.

The scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

What is claimed is:

1. An inductive power receiver for providing power to an electric load, said inductive power receiver comprising:
    at least one secondary inductor for forming an inductive couple with a primary inductor associated with an inductive power outlet;
    at least one power monitor operable to monitor output power of said secondary inductor; and
    at least one receiver-side frequency modulator operable to adjust the natural frequency of the inductive couple thereby bringing monitored output power closer to the required operating voltage of said electric load such that induced power provided to the electric load is regulated during power transfer,
wherein said at least one receiver-side frequency modulator comprises an element selected from the group consisting of:
  at least one frequency modulation coil configured to modify magnetic permeability of at least one magnetic flux guide;
  at least one dimension modifier configured to modify the dimensions of at least one inductor;
  at least one dimension modifier configured to modify the dimensions of at least one capacitor; and
  a combination thereof.

2. The inductive power receiver of claim 1 wherein said dimension modifier is configured to adjust distance between an inductive coil and a ferromagnetic core.

3. The inductive power receiver of claim 1 wherein said dimension modifier comprises at least one piezoelectric crystal wired to a variable direct current supply and coupled to at least one capacitive plate of the capacitor such that the distance between the capacitive plates is adjusted when the direct current supply is varied.

4. The inductive power receiver of claim 1 further comprising at least one magnetic flux guide for directing magnetic flux from the primary inductor to the secondary inductor wherein said frequency modulator comprises at least one modulation coil wired to a variable direct current supply and operable to modify magnetic permeability of the magnetic flux guide.

5. The inductive power receiver of claim 1 further comprising at least one magnetic flux guide for directing magnetic flux from the primary inductor to the secondary inductor wherein said frequency modulator comprises at least one-dimension modifier configured to adjust the dimensions between the flux guide and the secondary inductor.

6. The inductive power receiver of claim 5 wherein said dimension modifier comprises at least one piezoelectric crystal coupled to the flux guide and the secondary inductor and wired to a variable direct current supply such that the distance between the flux guide and the secondary inductor is adjusted when the direct current supply is varied.

7. An inductive power outlet for providing power to at least one electric load via at least one inductive power receiver, said inductive power outlet comprising:
  at least one primary inductor for forming an inductive couple with at least one secondary inductor of said at least one inductive power receiver;
  a driver configured to provide a driving voltage across said primary inductor, said driving voltage oscillating at a transmission frequency significantly different from the natural frequency of said inductive couple;
  a signal detector operable to receive instruction signals from a signal emitter associated with said inductive power receiver during power transfer;
  at least one outlet-side frequency modulator operable to adjust the natural frequency of the inductive couple according to said instruction signals such that induced power provided to the electric load is regulated during power transfer,
  wherein said at least one outlet-side frequency modulator comprises an element selected from the group consisting of:
    at least one frequency modulation coil configured to modify magnetic permeability of at least one magnetic flux guide;
    at least one dimension modifier configured to modify the dimensions of at least one inductor;
    at least one dimension modifier configured to modify the dimensions of at least one capacitor; and
    a combination thereof.

8. The inductive power outlet of claim 7 wherein said dimension modifier is configured to adjust distance between said primary inductive coil and a ferromagnetic core.

9. The inductive power outlet of claim 7 wherein said dimension modifier is configured to modify the dimensions of at least one capacitor.

10. The inductive power outlet of claim 7 further comprising at least one magnetic flux guide for directing magnetic flux from the primary inductor to the secondary inductor wherein said frequency modulator comprises at least one modulation coil wired to a variable direct current supply and operable to modify magnetic permeability of the magnetic flux guide.

11. A method for regulating power transfer across an inductive couple between an inductive power outlet and an inductive power receiver, the method comprising:
  providing an inductive power outlet comprising a primary coil and a driver;
  providing an inductive power receiver comprising a secondary coil, a power monitor
  providing at least one frequency modulator;
  said driver providing a voltage to a primary coil oscillating at a transmission frequency significantly different from the natural frequency of said inductive couple;
  inducing a secondary voltage across said secondary coil wired to an electric load;
  determining a required power range for said electric load;
  monitoring power received by the electric load during power transfer;
  comparing said power received by the electric load to the required power during power transfer;
  if the monitored power lies outside the required power range instructing said frequency modulator to adjust the natural frequency of said inductive couple during power transfer; and said frequency modulator adjusting the natural frequency of said inductive couple during power transfer such that the monitored power is regulated during power transfer,
  wherein said frequency modulator adjusting is selected from the group consisting of:
    modifying magnetic permeability of at least one magnetic flux guide of at least one frequency modulation coil;
    modifying the dimensions of at least one inductor by at least one dimension modifier; and
    modifying the dimensions of at least one inductor by the at least one dimension modifier.

12. The method of claim 11 wherein the step of instructing said frequency modulator to adjust the natural frequency of said inductive couple during power transfer comprises: a signal emitter associated with said inductive power receiver sending a signal; and a signal detector associated with said inductive power transmitter receiving said signal.

* * * * *